United States Patent

Parks

[11] Patent Number: 6,072,603
[45] Date of Patent: Jun. 6, 2000

[54] MULTIPLE OUTPUT CCD IMAGE BLOCK BALANCING

[75] Inventor: Christopher Parks, Rochester, N.Y.

[73] Assignee: Eastman Kodak Company, Rochester, N.Y.

[21] Appl. No.: 08/606,674

[22] Filed: Feb. 26, 1996

[51] Int. Cl.[7] .................................................. H04N 1/46
[52] U.S. Cl. ........................ 358/504; 358/523; 358/406
[58] Field of Search .................................. 358/506, 504, 358/523, 513, 514, 406, 482, 483

[56] References Cited

U.S. PATENT DOCUMENTS

| | | | |
|---|---|---|---|
| 3,743,772 | 7/1973 | Pieters et al. | 178/7.2 |
| 4,032,975 | 6/1977 | Malueg et al. | 358/213 |
| 4,343,021 | 8/1982 | Frame | 358/213 |
| 4,520,395 | 5/1985 | Abe | 358/163 |
| 4,776,031 | 10/1988 | Mita | 358/483 |
| 4,811,114 | 3/1989 | Yamamoto et al. | 358/280 |
| 5,086,343 | 2/1992 | Cook et al. | 358/213 |
| 5,285,293 | 2/1994 | Webb et al. | 358/471 |
| 5,327,247 | 7/1994 | Osborne et al. | 348/100 |
| 5,361,140 | 11/1994 | Hayenga et al. | 358/446 |
| 5,455,622 | 10/1995 | Compton | 348/229 |

FOREIGN PATENT DOCUMENTS

| | | |
|---|---|---|
| 3309949 | 9/1984 | Germany . |
| 0171862 | 9/1985 | Japan . |
| 2163620 | 2/1986 | United Kingdom . |

*Primary Examiner*—Thomas D. Lee
*Attorney, Agent, or Firm*—James D. Leimbach

[57] ABSTRACT

A CCD imager which employs multiple outputs to increase frame rates suffers from imbalances between the signal processing electronics of each output. The imbalances may result in an image of unacceptable quality. A method for eliminating image imbalances on multiple output CCD image sensors. Calibration of multi-block image sensors having a block readout format is accomplished employing look up tables (LUTs) that have their values determined during a calibration cycle. A test pattern is placed in front of the sensor and its pattern read into the image sensor. The LUTs have their values determined by comparing charges within cells along the borders of the blocks of the image sensor to corresponding cells along the border for the adjacent block. A polynomial equation is determined via a least square fitting routine for these cells which is then used to determine scaling factors for each block. These scaling factors are stored in the LUTs for each block, at least along the borders for the multi-block image sensor in order to provide for smooth transitions across the borders of the blocks.

10 Claims, 4 Drawing Sheets

MULTIPLE OUTPUT CCD IMAGE BLOCK BALANCING

FIELD OF INVENTION

The invention relates generally to the field of multiple block readout image sensors, and more specifically, to generating look up tables to minimize differences between pixels along the borders of adjacent blocks.

BACKGROUND OF THE INVENTION

In order to obtain high frame rates on CCD image sensors it has become necessary to read out the image in parallel through multiple outputs. For a sensor with two outputs there are two different regions of the image which pass through separate signal processing electronics. Minor process variations in the fabrication of the CCD cause the output amplifiers to have slightly different gains, typically 1% or less. More significantly, the signal processing electronics (SPE) external to the CCD contain many different components. The sum of the variations in all of the SPE components contributes to overall nonlinearity and offset errors which are easily visible in the image.

The degree to which gain and offset errors degrade the image quality depends heavily on the complexity of the image as well as whether or not the sensor is a color or monochrome device. If the image being viewed is very flat and uniform, such as a white piece of paper, then signal errors as small as 1% between outputs are easily visible. The problem is exacerbated by color devices because the blue pixels usually have a lower photoresponse than red or green pixels. Due to the large gain needed on blue pixels, the eye can spot signal differences less than 1%. Subtle changes in color across a block boundary are also easy to see.

As can be seen by the foregoing discussion, there remains a need within the art for a method and apparatus that can properly balance image sensors having multiple output block format. The present invention, as disclosed herein, will describe and evaluate a new method and apparatus for eliminating image imbalances on multiple output image sensors.

SUMMARY OF THE INVENTION

The present invention is directed to overcoming one or more of the problems set forth above. Briefly summarized, one aspect of the present invention discloses a method of calibrating multi-block image sensors having a block readout format by employing look up tables (LUTs) that have their values determined during a calibration cycle. A test pattern is placed in front of the sensor and its pattern read into the image sensor. The LUTs have their values determined by comparing charges within cells along the borders of the blocks of the image sensor to corresponding cells along the border for the adjacent block. An corrected polynomial curve is determined via a least square fitting routine from these cells which is then used to generate a LUT for all cells within a block. The LUTs provide for smooth transitions across the borders of the blocks.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: (1) it is very easy to implement by the camera operator; (2) it can be done with the camera lens on under the desired lighting conditions; (3) it will remove all nonlinearities from the sensor and the signal processing electronics including column defects; (4) it provides high picture quality for multiple-output color or monochrome image sensors; and (5) improves color reproduction by allowing selective gain of the blue pixels over red and green in the analog domain.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 2A:
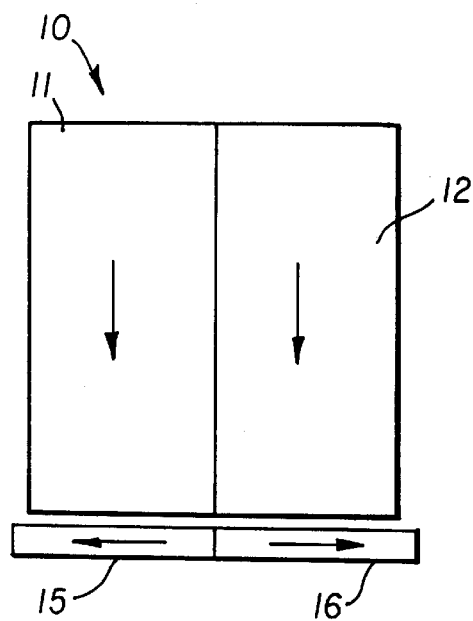
FIG. 2a illustrates a sensor having two output horizontal shift registers.
Figure 2B:
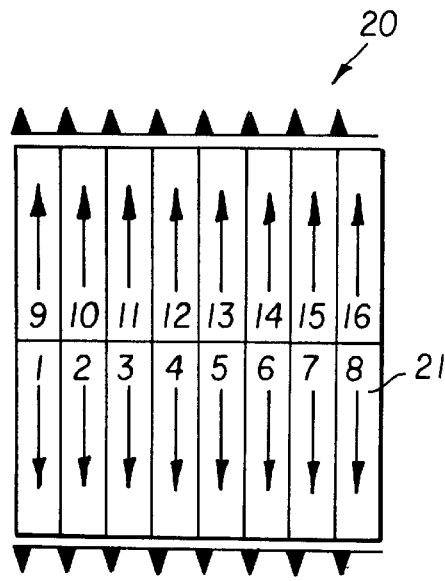
FIG. 2b shows an image sensor having 16 outputs.

Referring now to FIG. 2a and FIG. 2b, there are three types of multiple block output sensors having different layouts. FIG. 2a illustrates a sensor 10 having two output horizontal shift registers 15, 16 arranged to output image data stored in the two image storage areas 11, 12. The configuration shown by image sensor 10 is that of a KAI-1002M manufactured by Eastman Kodak. FIG. 2b shows an image sensor 20 having 16 outputs 21. An image sensor having this configuration is typical of a KHS-0197-16 manufactured by Eastman Kodak.

It should be understood that the type of CCD image sensors to which the present invention pertains are those with two or more outputs reading out separate image area blocks. Images acquired by a 16 output sensor, such as a Eastman Kodak KHS-0197-16, with unbalanced outputs and unbalanced SPE will exhibit imbalances resulting in errors as large as 6%. By balancing the outputs the imbalances are not visible because the outputs were balanced to less than 0.5% error.

There are several different methods of balancing the signal processing electronics (SPE) of each block within an image sensor. Two basic methods will be examined herein.

Figure 1:
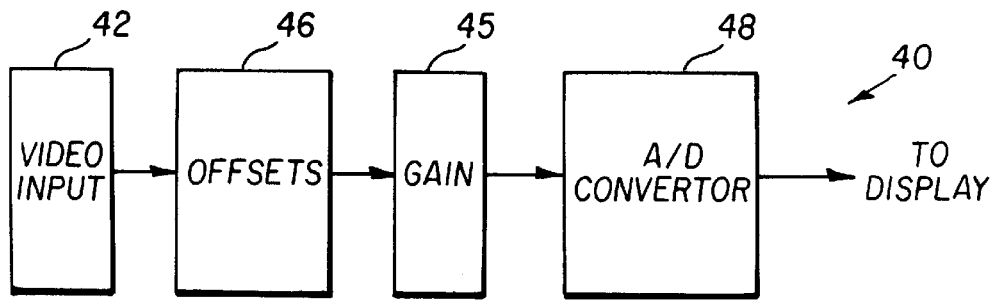
FIG. 1 is a diagram of prior art linear correction.

Referring to FIG. 1, which is a block diagram of a typical implementation of a linear correction method for a sensor employing offset and gain corrections, this implementation is generally referred to as 40, a simple method for balancing the SPE is to assume the photoresponse of the sensor and signal processing electronics are linear functions of the light intensity. In this case the signal at output n will satisfy the relationship shown by Equation 1.

$$y = gx + b,\qquad\text{Equation 1}$$

where y is the signal output, x is the light intensity, g and b are, respectively, the Signal Processing Electronics gain and offsets.

The blocks of the sensor can then be balanced by inserting programmable analog gain 45 and offset 46 corrections into the SPE electronics as seen in the linear implementation 40 shown in FIG. 1. The main weakness of linear implementation shown in FIG. 1 is the underlying assumption that all of the components of the SPE are perfectly linear. A linear assumption may be justified for monochrome images, but degraded image quality due to nonlinear photoresponse can be spotted first in color image sensors.

Figure 3:
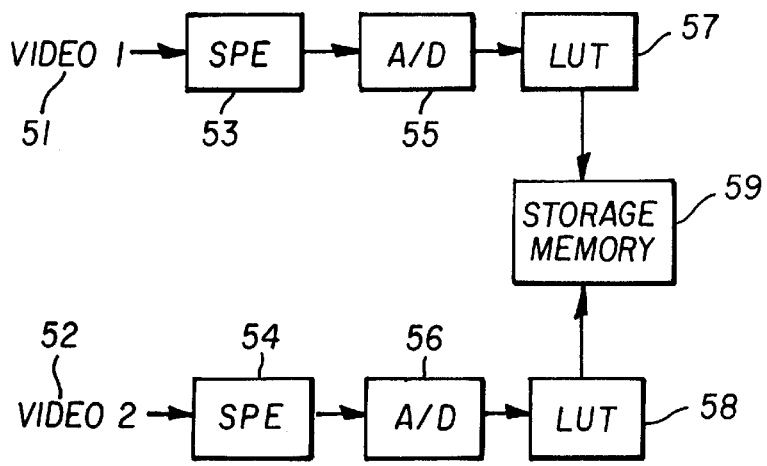
FIG. 3 is a block diagram of the preferred embodiment.

Referring to FIG. 3, which is a block diagram of the preferred embodiment of the present invention, a device for implementing a nonlinear corrections method can be seen. As seen in FIG. 3, there are two video sources 51, 52 each being operated on by individual signal processing electronics 53, 54 prior to placing the adjusted video into digital format via the analog to digital converter (A/D) 55, 56. The digitized video is used to address look up tables (LUTs) 57, 58 and the data from the LUTs 57, 58 is placed into storage memory 59. The ideal method of balancing the SPE 53, 54 for each block would be to allow a nonlinear correction of the signal. This can be achieved by utilizing LUTs 57, 58 between A/D 55, 56 and the storage memory 59 as illustrated in FIG. 3. This scheme allows an mth order nonlinear correction as shown in Equation 2.

$$y_n = \sum_{i=o}^{m} a_i x^i.\qquad\text{Equation 2}$$

where:

x=signal from A/D 55, 56; and y=corrected output sent to storage memory 59.

One potential drawback to the use of a LUT is that some values of the A/D range will be skipped. For example, if an 8-bit A/D is used, the signal will range from 0 to 255. If the digital values are then passed through a nonlinear or even a linear LUT, some of the values will be skipped due to round off errors in generating the LUT. This is avoided in the preferred embodiment by using Analog to Digital Converters 55, 56. Analog to Digital Converters 55, 56 digitize the signal to a higher resolution than what is stored in the storage memory 59, For example, using a 10-bit A/D and passing the data through a 10-bit in, 8-bit out LUT. However, this will add to the cost of the SPE, but is preferred because of the increased accuracy.

For color sensors, a LUT is particularly attractive because the memory used to store the LUT can be loaded with two or more LUT's. One LUT may be used for red and green pixels and the second for blue pixels. The timing logic would select the appropriate LUT. A 10-bit A/D coupled with a 10-bit in, 8-bit out LUT improves the accuracy of the blue response by four times that of an 8-bit A/D while still using 8-bit image memory storage. A multicolor LUT will significantly improve the image quality.

Ideally, balancing of the signal processing electronics should take into consideration the following traits:

(1) produce high image quality;

(2) be trivial to use by the camera operator;

(3) not require any special light sources;

(4) allow block balancing with the desired camera lens on; and (5) do it in less than 5 seconds.

The requirement of high image quality can be met if the SPE electronics allow nonlinear corrections, especially on color sensors. Ease of use by the camera operator is essential because balancing the SPE electronics at the factory will not produce good quality images. This is mainly due to temperature variations in the customer's camera environment. Special light sources used for the block balancing procedure will be inconvenient to the customer, add cost, and will not produce a balanced image under the customer's desired lighting conditions. Special light sources may also require removal of the camera lens which further inconveniences the customer.

The block balancing methodology will be described for the KHS-0197-16 sensor shown in FIG. 1b. For the camera operator the procedure would be to focus the image shown in FIG. 4 which is a test pattern, generally referred to as 5, so that it fills the entire sensor area and then instruct the camera to calibrate itself. The camera should immediately record one frame (or average several together). That is all that is required of the camera operator.

The purpose of the test pattern 5 is to provide a continuously varying gray scale where the intensity gradient is parallel to the boundaries of the blocks. The image contrast should be such that the bright to dark areas represent the darkest and brightest objects that the camera will be viewing. The image of test pattern 5 does not have to be precisely aligned to the image sensor. Test pattern 5 having this one image will provide enough information to construct a nonlinear LUT for all 16 blocks of the sensor.

For the two block imager, such as the KA1-1002M shown in FIG. 1a, the test pattern could be almost any object with a low image complexity and high contrast.

Once the test image has been captured by the camera the balancing algorithm implemented in software should be able to execute in 1 or 2 seconds.

Figure 5:
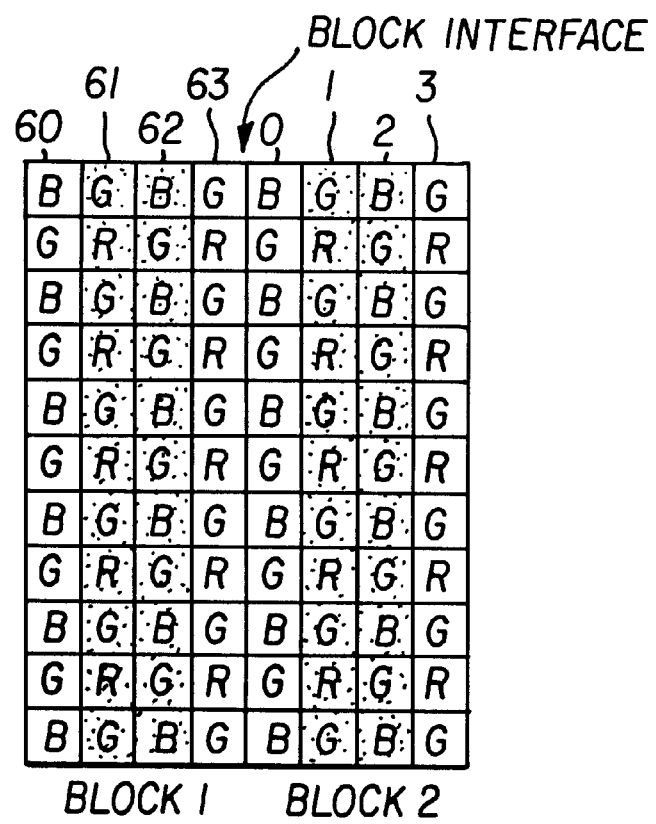
FIG. 5 is a diagram illustrating rows and columns near the block interface of a multiple block output image sensor.

Referring now to FIG. 5, consider the boundary of blocks 1 and 2 as shown in FIG. 5. As seen in FIG. 5, the last four columns (60, 61, 62, 63) of block 1 are adjacent to the first four columns (0, 1, 2, 3) of block 2. This figure represents a color KHS-0197C-16 image sensor having outputs that are similar to those shown for the image sensor in FIG. 1b. Each block is 64 pixels wide (as seen beginning with column 0 and ending with column 63) and has the Bayer color filter pattern. The objective is to generate a LUT for block 1 so that columns 61 and 62 match the intensity of columns 1 and 2 of block 2. This is done by constructing a series of (x,y) data points where x is the intensity of a pixel in block 1 and y is the intensity of a pixel in block 2. Each x and y value must be from the same color pixel in the same row of the image. Two columns of each block are used to ensure that all three colors of the filter pattern are used. Note that for KHS-0197-16 column 0 can not be used because it is the first column shifted out of the horizontal shift register. The vertical shift register clock pulse noise and horizontal clock noise feed through into the video output, so this column is always 1 or 2% different in intensity than the rest of the block. This defect will be discussed in more detail later. On KAI-1002M this will not be a problem so the columns immediately adjacent to the block boundary may be used without concern.

Figure 6:
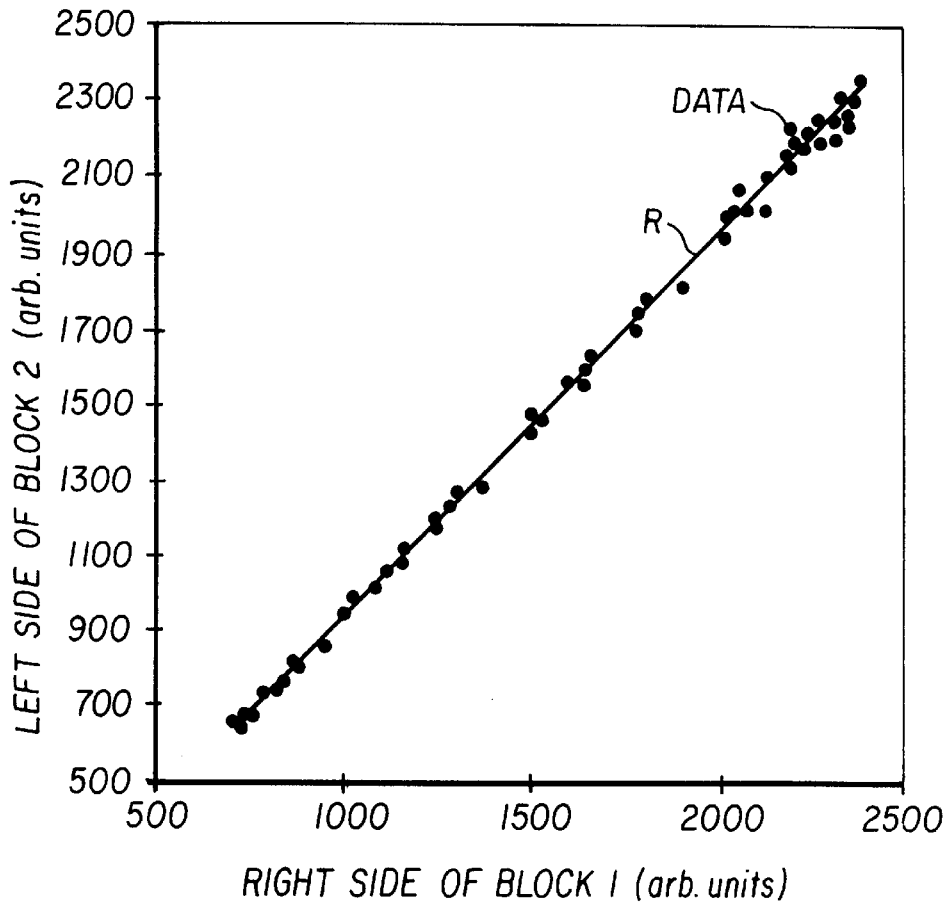
FIG. 6 is a graph indicating data points from a sensor and the least square fit created from those data points.

A typical set of (x,y) data points is shown in FIG. 6. They are heavily clustered at the low and high ends of the graph because most of the image is either bright or dark with some gray scale. The line is a second order polynomial fit. By changing the shading of the test pattern, different regions of the sensor output range will be weighted more heavily than others. The range weighted heaviest will be better balanced. To obtain a least squares fit to the mth order polynomial as shown by Equation 3 is required.

$$y = \sum_{j=0}^{m} a_j x^j,$$ Equation 3 the linear matrix equation Av=b is solved where A is the (m+1)×(m+1) symmetric matrix $$\begin{bmatrix} N & \sum x_i & \cdots & \sum x_i^m \\ \sum x_i & \sum x_i^2 & \cdots & \sum x_i^{m+1} \\ \vdots & \vdots & \ddots & \vdots \\ \sum x_i^m & \sum x_i^{m+1} & \cdots & \sum x_i^{2m} \end{bmatrix},$$

b and v are the vectors $$b = \begin{bmatrix} \sum y_i \\ \sum x_i y_i \\ \vdots \\ \sum x_i^m y_i \end{bmatrix}, \quad v = \begin{bmatrix} a_0 \\ a_1 \\ \vdots \\ a_m \end{bmatrix}.$$

In the above relationships, N is the total number of data points and the summations extend over the range 0 to N-1. The fitted line in FIG. 6 is used to generate the LUT for block 1.

The two block sensor KAI-1002M, as shown in FIG. 1a, would only need one lookup table to balance the image.

The 16 block sensor shown in FIG. 1b, the KHS-0197-16 requires 15 LUT's to be computed. One block out of the 16 is used as a reference. The reference block should be near the center (say block 4). The balancing algorithm should match the right side of block 3 to the left side of block 4. The left side of block 5 should be matched to the right side of block 4. Continue the block vertical edge matching from the center of the edge blocks for the 8 blocks on the top half and then the 8 blocks on the bottom half of the sensor. Note that when matching the right side of block 2 to the left side of block 3, the (x,y) data points from block 3 used to construct the LUT must be first passed through the block 3 LUT. By doing this all LUT's may be generated from one image without recording a new image after each LUT is generated.

Once the vertical block boundaries have been balanced the boundary between the top and bottom halves of the sensor must be balanced. This should be done by balancing all 8 blocks of each half as a collective unit. If the horizontal boundary is balanced separately for each top and bottom block then the vertical boundary match will be lost. This means that the set of (x,y) data points used for generating the LUT must come from the rows above or below the horizontal boundary extending across the vertical boundaries of all 8 blocks. Since all LUT's have already been defined from the matching of the vertical boundaries, the existing LUT's for the entire top or bottom half of the sensor must be modified together in exactly the same manner to match the horizontal boundary while maintaining the vertical boundary match.

Balancing first column defects

This section only applies to the KHS-0196-16, which is the image sensor shown in FIG. 1b, due to its unique horizontal shift register layout. In this device the first pixel shifted out of the horizontal CCD may be located away from the edge of the image. The first pixel generally has a different intensity than the rest of the image area. This is true of most CCD devices but it is not noticeable because the first pixel comes from the edge column of the imager. The exact origin of this defect is not known. They may originate from electrical noise due to vertical clock edges or from the startup of the horizontal CCD clocks feeding through into the video output. Charge losses may also contribute to the defect. The last pixel shifted out of the horizontal CCD does not suffer from this problem.

The first column defect may be eliminated by generating a separate LUT for the first column. The timing of the electronics can be programmed to enable this first column LUT for the first pixel of each line and then switch back to the standard LUT for the remainder of the line.

Figure 7:
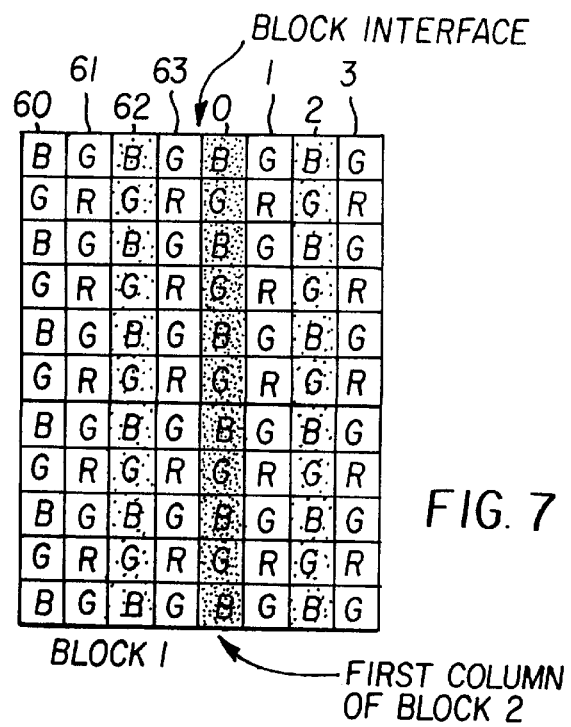
FIG. 7 is a diagram of the sensor shown in FIG. 5 illustrating column usage for correction of first column defects.

Referring now to FIG. 7, which is an illustration of the same multiple block image sensor shown in FIG. 5, the columns that are used to generate the LUT to average columns of adjacent blocks on a color sensor are shown. The LUT is generated to make column 0 match the average of column 2 and column 62 of the neighboring block. Columns 1 and 63 may be used for monochrome sensors.

Results

Figure 8:
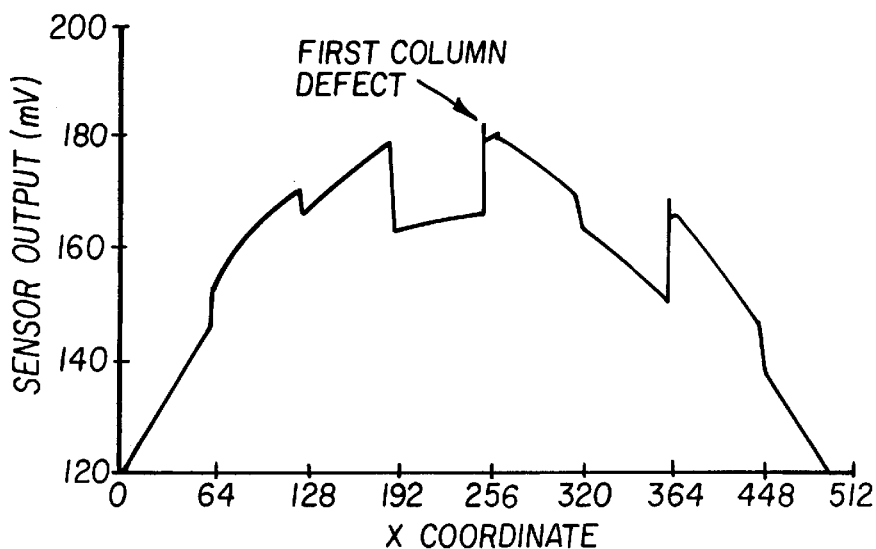
FIG. 8 is a horizontal line profile illustrating sensor output for an unbalanced sensor.

The block balancing algorithm has been implemented for the KHS-0197C-16 CCD image sensor, which is the image sensor shown in FIG. 1b, on a system using a 12 bit A/D converter and 12 bit LUT's. FIG. 8 shows a horizontal intensity profile across the top 8 blocks of an unbalanced 16 block sensor. The image is of a white piece of paper illuminated by a tungsten lamp. The image of FIG. 4 was focused onto the sensor using the same tungsten lamp light source and camera lens. The computer averaged together 8 frames and balanced the blocks in approximately 2 seconds. Most of the time was used in averaging the frames.

Figure 9:
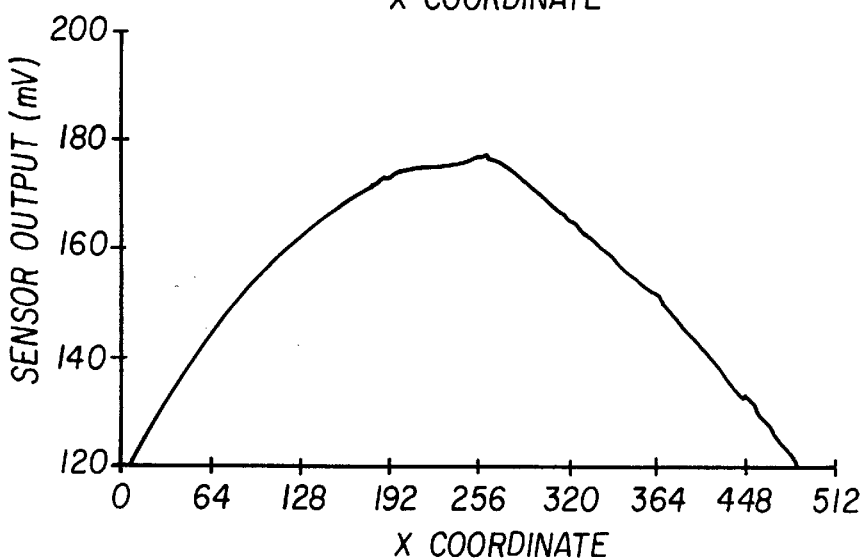
FIG. 9 is a horizontal line profile illustrating sensor output for a balanced sensor.

FIG. 9 shows the profile across the image of a white piece of paper after the sensor was balanced. The profile is peaked at the center of the image because of the camera lens intensity roll off (f/2.8) and the tungsten lamp illuminated the center more brightly than the edges. The balanced profile of FIG. 9 shows that the first column defects have also been removed. Some artifacts associated with fixed pattern system electronics noise can still be seen in the balanced profile.

Figure 10:
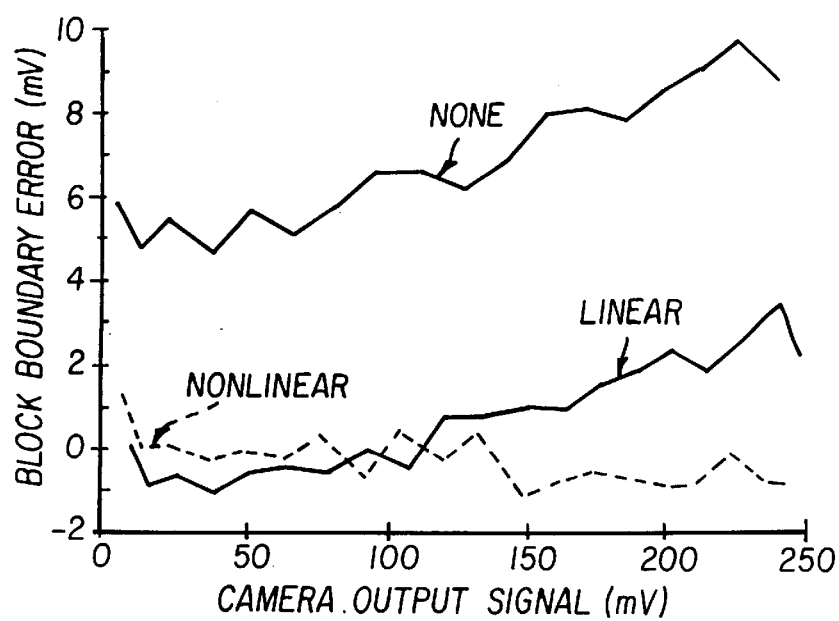
FIG. 10 is a graph illustrating error for different balancing methods and without balancing.

FIG. 10 compares the results for two block balancing methods. The data was measured on the Ektapro Motion Analyzer Model 1000HRC with the camera lens set to f/1.4. The light source was an integrating bar lit by white light from an array of red, green, and blue light emitting diodes (LED). The LED intensity was increased from zero until the sensor output reached 250 mV. The data was digitized by an 8-bit A/D converter. The difference in intensity of the right vertical edge of block 12 and the left edge of block 13 is plotted on the y axis. For a perfectly balanced sensor the error should be zero.

For the case with no balancing, the error between the two blocks rises from 5 to 10 mV. On a 256 mV full scale this is a large error (2 to 4%) and is very noticeable on the camera display.

The linear balancing method built into the camera required the camera lens to be removed and the sensor to be illuminated by a very uniform light source. The camera adjusts the high and low references of the A/D to balance the average block intensity at zero light level and at 50% illumination (128 mV). After the balancing procedure was complete the camera lens was put back on and the block balance error was measured again. The data shows that the blocks are very well balanced at zero and 128 mV but at higher light levels the blocks begin to diverge to 2.5 mV. This error of more than 1% is difficult to notice on monochrome sensors but can be seen as a slight color shift on color sensors.

Figure 4:
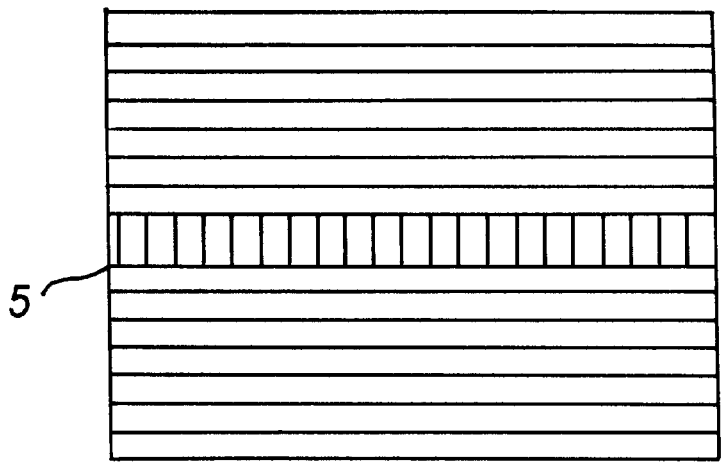
FIG. 4 is a test pattern as envisioned by the present invention for calibrating sensors of the type shown in FIG. 2b.

Finally, the camera was balanced by using a nonlinear LUT generated by focusing the camera on the image shown in FIG. 4. The 1000HRC does not have built in LUT's so the camera data was passed through 8-bit LUT's as it was downloaded from the camera processor into the measurement computer. The results show that the blocks stay balanced to within 1 mV ($\approx$=1 it/mV on the A/D) over the entire signal range. This does produce an improved picture quality over the linear balancing procedure.

FIG. 10 also shows that balancing the blocks at zero light intensity should be avoided. The error for both the linear and nonlinear block balancing methods jumps by about 1 mV between zero and low illumination (note the camera adjusts its offset so that an output of 10 corresponds to no light). This 1 mV jump causes a built in error at low light levels for any method which balances the blocks at zero light level. The nonlinear LUT method is not effected by this zero offset jump because the fitting procedure minimizes the error at all light levels, not just at two light levels.

Concluding Remarks

The results show that if high image quality is required, a camera design should include a LUT on each video channel. This will ensure the maximum degree of flexibility for balancing the image blocks. Serious consideration should also be given to allowing multiple LUT's for each video channel on color devices in order to obtain a better signal range on blue pixels. LUT's also provide protection against any unforeseen nonlinear effects in the camera design.

The invention has been described with reference to a preferred embodiment. However, it will be appreciated that variations and modifications can be effected by a person of ordinary skill in the art without departing from the scope of the invention.

Parts List 0 column of cells to block 2
1 column of cells to block 2
2 column of cells to block 2
3 column of cells to block 2
5 test pattern
10 2 block image sensor
11 storage area 1
12 storage area 2
15 horizontal shift register for storage area 1
16 horizontal shift register for storage area 2
20 16 block image sensor
21 individual block
30 64 block image sensor
31 individual block
51 video 1 input
52 video 2 input
53 video 1 signal processing electronics
54 video 2 signal processing electronics
55 first A/D
56 second A/D
57 LUT
58 LUT
59 storage memory
60 column of cells to block 1
61 column of cells to block 1
62 column of cells to block 1
63 column of cells to block 1

I claim:

1. A method of calibrating multi-block image sensors having a block readout format by employing look up tables (LUTs) that have their values determined during a calibration cycle comprising the steps of:

providing a test pattern having a predetermined image;

providing a multi-block image sensor with means for acquiring the predetermined image on the test pattern within the image sensor and reading the acquired image out of the image sensor;

acquiring the image on the test pattern within the image sensor and reading the predetermined pattern out of the image sensor;

generating a set of look up tables (LUTs) that have storage locations with values determined by comparing charges within cells along block borders of the image sensor to corresponding cells along adjacent blocks and determining a polynomial from cell values along adjacent blocks and determining the look up tables from the polynomial; and employing the LUTs to correct values representative of charges within cells along at least one border between blocks within the multi-block sensor.

2. The method of claim 1 wherein the step of employing further comprises employing a least square fitting routine to determine the polynomial.

3. The method of claim 2 wherein the step of generating further comprises applying a linear matrix equation, Av=b, where A is a (m+1)×(m+1) symmetric matrix $$\begin{bmatrix} N & \sum x_i & \cdots & \sum x_i^m \\ \sum x_i & \sum x_i^2 & \cdots & \sum x_i^{m+1} \\ \vdots & \vdots & \ddots & \vdots \\ \sum x_i^m & \sum x_i^{m+1} & \cdots & \sum x_i^{2m} \end{bmatrix},$$

b and v are vectors of the form $$b = \begin{bmatrix} \sum y_i \\ \sum x_i y_i \\ \vdots \\ \sum x_i^m y_i \end{bmatrix}, \quad v = \begin{bmatrix} a_0 \\ a_1 \\ \vdots \\ a_m \end{bmatrix}.$$

4. The method of claim 1 wherein the step of generating further comprises determining the least squares fitting according to the mth order polynomial as shown by the expression $$y = \sum_{j=0}^{m} a_j x^j,$$

5. The method of claim 1 wherein the step of providing a test pattern having a predetermined image further comprises the predetermined image on the test pattern being selected to weight different output intensity levels of the sensor more heavily than others.

6. The method of claim 1 wherein the step of providing a test pattern having a predetermined image further comprises having as the predetermined image a continuously varying gray scale having an intensity gradient that is parallel to boundaries of output blocks within the image sensor.

7. A system for calibrating multi-block image sensors having a block readout format by employing look up tables (LUTs) that have their values determined during a calibration cycle comprising the steps of:

a multi-block image sensor with means for reading images into the image sensor;

a set of look up tables (LUTs) that have values determined during a calibration cycle by reading a test pattern having a predetermined image into the image sensor and comparing charges within cells along at least one block border of the image sensor to corresponding cells along adjacent blocks; and means for determining a polynomial from cell values along adjacent blocks and determining the LUTs from the polynomial and employing values within the LUTs to scale charges within cells along the at least one block border of the image sensor.

8. The system of claim 7 wherein the means for determining further comprises a least square fitting routine.

9. The system of claim 7 wherein the test pattern having a predetermined image further comprises as the predetermined image an image selected to weight different portions of the sensor more heavily than others.

10. The system of claim 7 wherein the test pattern has an image that further comprises a continuously varying gray scale having an intensity gradient that is parallel to boundaries of output blocks within the image sensor.

\* \* \* \* \*